US012017640B2

(12) United States Patent
Fukuda et al.

(10) Patent No.: US 12,017,640 B2
(45) Date of Patent: Jun. 25, 2024

(54) CONTROL METHOD AND CONTROL SYSTEM OF HYBRID VEHICLE

(71) Applicant: Mazda Motor Corporation, Hiroshima (JP)

(72) Inventors: Yutaro Fukuda, Aki-gun (JP); Tadashi Saito, Aki-gun (JP); Takahiro Kashimoto, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 349 days.

(21) Appl. No.: 17/684,914

(22) Filed: Mar. 2, 2022

(65) Prior Publication Data

US 2022/0306083 A1 Sep. 29, 2022

(30) Foreign Application Priority Data

Mar. 26, 2021 (JP) .................. 2021-053190

(51) Int. Cl.
*B60W 20/40* (2016.01)
*B60K 6/387* (2007.10)
(Continued)

(52) U.S. Cl.
CPC ............. *B60W 20/40* (2013.01); *B60K 6/387* (2013.01); *B60W 10/023* (2013.01);
(Continued)

(58) Field of Classification Search
CPC ...... B60W 20/40; B60W 20/00; B60W 10/11; B60W 2710/022; B60W 20/20; B60W 30/20; B60K 6/387
See application file for complete search history.

(56) References Cited

U.S. PATENT DOCUMENTS

2007/0056784 A1* 3/2007 Joe ............................ B60L 7/26
180/65.245
2010/0075798 A1* 3/2010 Suzuki .................. B60W 10/08
903/946

(Continued)

FOREIGN PATENT DOCUMENTS

JP 2000255285 A 9/2000
JP 2005231440 A * 9/2005

*Primary Examiner* — Khoi H Tran
*Assistant Examiner* — Dairon Estevez
(74) *Attorney, Agent, or Firm* — Alleman Hall & Tuttle LLP

(57) ABSTRACT

A hybrid vehicle controlling method is provided. In response to an engine startup demand, when a vehicle target driving force is below a given value, an instruction hydraulic pressure for a hydraulic control circuit is set to a first pressure at which an increase rate in an engagement pressure at a start of engaging of a friction engagement element becomes below a given rate and maintained for a given time period, then set to a second pressure at which an engine-startup engagement pressure is applied to the friction engagement element and maintained until the engine startup is completed, and then set to a third pressure for setting the friction engagement element to an engaged state. When the target driving force is above the given value, the instruction hydraulic pressure is set to the second pressure and maintained until the engine startup is completed, and then set to the third pressure.

19 Claims, 5 Drawing Sheets

(51) Int. Cl.
  *B60W 10/02* (2006.01)
  *B60W 30/192* (2012.01)
  *B60K 6/26* (2007.10)
(52) U.S. Cl.
  CPC ..... *B60W 30/192* (2013.01); *B60K 2006/268* (2013.01); *B60W 2710/083* (2013.01)

(56) References Cited

U.S. PATENT DOCUMENTS

| | | | |
|---|---|---|---|
| 2011/0009237 A1* | 1/2011 | Kim | F16H 61/0437 903/945 |
| 2014/0288754 A1* | 9/2014 | Kasuya | F16D 48/062 903/946 |
| 2018/0170359 A1* | 6/2018 | Kim | B60K 6/387 |
| 2019/0126908 A1* | 5/2019 | Yokota | B60W 10/06 |

* cited by examiner

CONTROL METHOD AND CONTROL SYSTEM OF HYBRID VEHICLE

TECHNICAL FIELD

The present disclosure relates to a control method and a control system of a hybrid vehicle including an engine and a motor as a driving source, and a friction engagement element (clutch) which switches transmission and interruption of torque between the engine and the motor.

BACKGROUND OF THE DISCLOSURE

Conventionally, hybrid vehicles including an engine (internal combustion engine), a motor provided downstream of the engine on a power transmission path to vehicle wheels, a first clutch provided between the engine and the motor to be disengageable, and a second clutch provided between the motor and the vehicle wheels (drive wheels) to be disengageable, are known. This type of hybrid vehicle is switchable of a traveling mode between a mode in which the hybrid vehicle travels using motor torque without using engine torque (EV traveling mode), and a mode in which the hybrid vehicle travels using at least the engine torque (engine traveling mode or hybrid (HV) traveling mode).

For example, JP2000-255285A discloses a technology for this kind of hybrid vehicle, in which when starting-up an engine while traveling using only a motor, the motor speed is increased while a second clutch (start clutch) is slip-controlled, and then when the motor speed reaches a given speed, a first clutch (engine clutch) is engaged.

In the hybrid vehicle as described above, upon the startup of the stopped engine during the traveling, the first clutch provided between the engine and the motor is shifted from a released state to the engaged state. Accordingly, motor torque is transmitted to the engine via the first clutch, and the engine is started by being cranked by the motor.

If an engagement pressure changes too rapidly when the first clutch is shifted from the released state to the engaged state in order to start the engine, lowering of a driving force accompanying with the start of the engine increases a shock caused to the vehicle (vehicle shock). On the other hand, if the engagement pressure changes too slowly, a period of time taken for completion of the engine startup lengthens, which degrades a startup response of the engine in response to a demand from a driver.

SUMMARY OF THE DISCLOSURE

The present disclosure is made in view of solving the above problems, and one purpose thereof is to provide a control method and a control system of a hybrid vehicle, capable of reducing a vehicle shock when starting-up an engine of the hybrid vehicle while securing a startup response of the engine by accurately controlling a first clutch provided between the engine and a motor.

According to one aspect of the present disclosure, a method of controlling a hybrid vehicle is provided. The hybrid vehicle includes an engine, a motor, a friction engagement element provided between the engine and the motor to be disengageable by hydraulic pressure, and a hydraulic control circuit configured to control the hydraulic pressure to be applied to the friction engagement element. The method includes the steps of controlling the hydraulic pressure to be applied to the friction engagement element in response to a startup demand of the engine in a stopped state during traveling of the hybrid vehicle so that the friction engagement element is shifted from a released state to one of a given slipping state and an engaged state, and controlling the motor and the engine so that the motor cranks the engine to start, one or both of during and after the controlling the hydraulic pressure. The controlling the hydraulic pressure includes, when a target driving force of the hybrid vehicle is below a given value, setting an instruction hydraulic pressure for the hydraulic control circuit to a first hydraulic pressure and maintaining the first hydraulic pressure for a given period of time, then setting the instruction hydraulic pressure to a second hydraulic pressure and maintaining the second hydraulic pressure until the engine start is completed, and then setting the instruction hydraulic pressure to a third hydraulic pressure, the first hydraulic pressure being a pressure at which an increase rate in an engagement pressure at a start of engaging of the friction engagement element becomes below a given rate, the second hydraulic pressure being a pressure at which an engine-startup engagement pressure for transmitting torque required for the engine start is applied to the friction engagement element, and the third hydraulic pressure being a pressure for setting the friction engagement element to the engaged state. The controlling the hydraulic pressure includes, when the target driving force of the hybrid vehicle is above the given value, setting the instruction hydraulic pressure to the second hydraulic pressure without setting to the first hydraulic pressure, and maintaining the second hydraulic pressure until the engine start is completed, and then setting the instruction hydraulic pressure to the third hydraulic pressure.

According to this configuration, in response to the startup demand of the engine, when controlling the hydraulic pressure to be applied to the friction engagement element, in the case where the target driving force of the hybrid vehicle is below the given value, the instruction hydraulic pressure for the hydraulic control circuit is set to the first hydraulic pressure at which the increase rate in the engagement pressure at the start of engaging of the friction engagement element becomes below the given rate, and it is maintained for the given period of time. Then, the instruction hydraulic pressure is set to the second hydraulic pressure, and it is maintained until the engine start is completed. Then, the instruction hydraulic pressure is set to the third hydraulic pressure and the friction engagement element is made into the engaged state. Therefore, when the target driving force is below the given value, and the suppression of the vehicle shock is to be prioritized over the startup response of the engine, the occurrence of the vehicle shock at the start of engaging of the friction engagement element to start the engine, can be avoided. On the other hand, when the target driving force is above the given value, the instruction hydraulic pressure is set to the second hydraulic pressure without setting to the first hydraulic pressure, and it is maintained until the engine start is completed. Therefore, when the target driving force is above the given value, and the improvement in the startup response of the engine is to be prioritized over the suppression of the vehicle shock, the engine can promptly be cranked to start in response to the issuance of the startup demand of the engine, and thus, the startup response of the engine can be secured. As described above, according to this configuration, the vehicle shock can be suppressed while securing the startup response of the engine.

The controlling the hydraulic pressure may include, when the start of the engine is demanded, first setting the instruction hydraulic pressure to a fourth hydraulic pressure at which an engagement pressure higher than the engine-startup engagement pressure is applied to the friction engagement element, and maintaining the fourth hydraulic pressure for a given period of time.

According to this configuration, the hydraulic oil can promptly be supplied to the friction engagement element immediately after the issuance of the startup demand of the engine, which improves the response of the friction engagement element in the subsequent control.

When the target driving force is above the given value, the period of time during which the instruction hydraulic pressure is maintained at the fourth hydraulic pressure may be longer compared with when the target driving force is below the given value.

According to this configuration, the response of the friction engagement element can further be improved.

The controlling the hydraulic pressure may include, when the target driving force is below the given value, after the setting the instruction hydraulic pressure to the first hydraulic pressure and maintaining for the given period of time, and before the setting the instruction hydraulic pressure to the second hydraulic pressure, setting the instruction hydraulic pressure to a fifth hydraulic pressure for making the friction engagement element stand by in a state immediately before engaging, and maintaining the fifth hydraulic pressure until a given condition is satisfied.

According to this configuration, for example, when the startup of the engine is required to be waited until other devices become ready, the torque transmission between the motor and the engine is interrupted, and once the other devices become ready, the friction engagement element can promptly engage so that the engine starts-up.

The friction engagement element may be a normally-open clutch, the third hydraulic pressure may be higher than the second hydraulic pressure, and the second hydraulic pressure may be higher than the first hydraulic pressure.

Alternatively, the friction engagement element may be a normally-closed clutch, the third hydraulic pressure may be higher than the second hydraulic pressure, and the second hydraulic pressure may be higher than the first hydraulic pressure.

According to another aspect of the present disclosure, a control system of a hybrid vehicle is provided, which includes an engine and a motor, a friction engagement element provided between the engine and the motor to be disengageable by hydraulic pressure, a hydraulic control circuit configured to control the hydraulic pressure to be applied to the friction engagement element, and a control device configured to control the engine, the motor, the friction engagement element, and the hydraulic control circuit. The control device is configured to control the hydraulic pressure to be applied to the friction engagement element in response to a startup demand of the engine in a stopped state during traveling of the hybrid vehicle so that the friction engagement element is shifted from a released state to one of a given slipping state and an engaged state, and control the motor and the engine so that the motor cranks the engine to start, one or both of during and after the control of the hydraulic pressure. When the control device controls the hydraulic pressure, and when a target driving force of the hybrid vehicle is below a given value, the control device sets an instruction hydraulic pressure for the hydraulic control circuit to a first hydraulic pressure and maintains the first hydraulic pressure for a given period of time, then sets the instruction hydraulic pressure to a second hydraulic pressure and maintains the second hydraulic pressure until the engine startup is completed, and then sets the instruction hydraulic pressure to a third hydraulic pressure, the first hydraulic pressure being a pressure at which an increase rate in an engagement pressure at a start of engaging of the friction engagement element becomes below a given rate, the second hydraulic pressure being a pressure at which an engine-startup engagement pressure for transmitting torque required for the engine start is applied to the friction engagement element, and the third hydraulic pressure being a pressure for setting the friction engagement element to the engaged state. When the target driving force of the hybrid vehicle is above the given value, the control device sets the instruction hydraulic pressure to the second hydraulic pressure without setting to the first hydraulic pressure, and maintains the second hydraulic pressure until the engine start is completed, and then sets the instruction hydraulic pressure to the third hydraulic pressure.

DETAILED DESCRIPTION OF THE DISCLOSURE

Hereinafter, a control method and a control system of a hybrid vehicle according to one embodiment of the present disclosure are described with reference to the accompanying drawings.

Device Configuration

Figure 1:
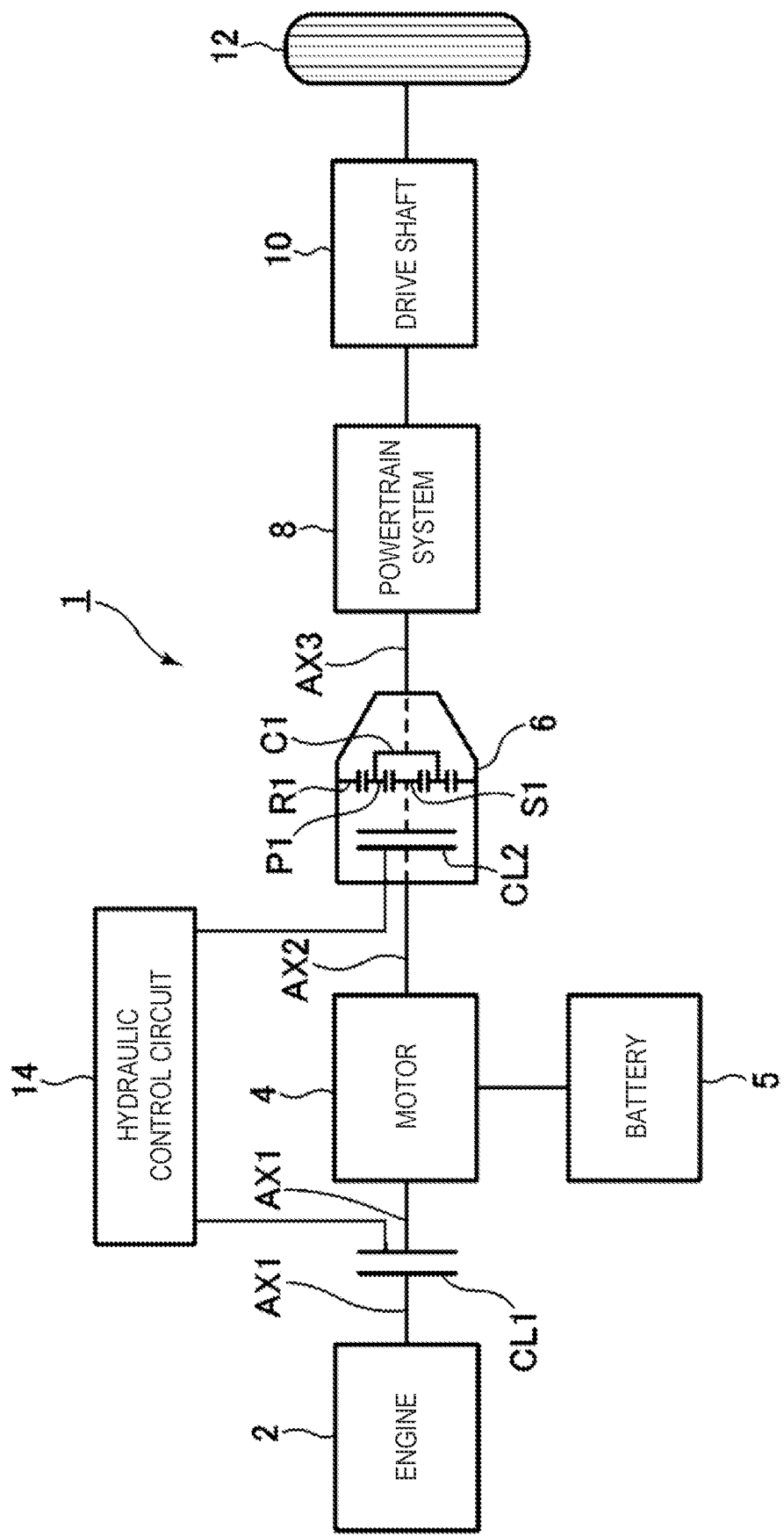
FIG. 1 is a diagram illustrating a schematic configuration of a hybrid vehicle according to one embodiment of the present disclosure.

FIG. 1 is a diagram illustrating a schematic configuration of a hybrid vehicle according to this embodiment.

As illustrated in FIG. 1, a hybrid vehicle 1 mainly includes an engine 2 (e.g., a gasoline engine), a motor 4, a battery 5, a transmission 6, a powertrain system 8, a drive shaft 10, and vehicle wheels (drive wheels) 12. The engine 2 generates torque for driving the hybrid vehicle 1. The motor 4 is provided downstream of the engine 2 on a power transmission path of the hybrid vehicle 1, and generates torque for driving the hybrid vehicle 1. The battery 5 sends and receives electric power to/from the motor 4 via, for example, an inverter (not illustrated). The transmission 6 is provided downstream of the motor 4 on the power transmission path of the hybrid vehicle 1, and changes a rotational speed of the engine 2 and/or the motor 4. The powertrain system 8 transmits the torque downstream from the transmission 6, and the drive shaft 10 drives the vehicle wheels 12 by the torque from the powertrain system 8.

An output shaft of the engine 2 and a rotational shaft of the motor 4 are coaxially coupled together by a shaft AX1 via a first clutch CL1 which is disengageable (disconnectable) by hydraulic pressure. This first clutch CL1 (friction engagement element) switches transmission and interruption of the torque between the engine 2 and the motor 4. The first clutch CL1 is comprised of, for example, a dry multi-plate clutch or a wet multi-plate clutch which is changeable of a transmission torque capacity by a successive or phased control of a flow rate and/or a pressure of clutch hydraulic oil by a hydraulic control circuit 14. The first clutch CL1 is configured as a normally-open clutch which is released (released state) when the hydraulic pressure is not applied, or a normally-closed clutch which is engaged (engaged state) when the hydraulic pressure is not applied. The hydraulic control circuit 14 is further provided with a hydraulic pump which is driven by the engine 2 or a motor (not illustrated), solenoid valves which control hydraulic pressure to be applied to the first clutch CL1 and a second clutch CL2, and oil passages which connect the valves to the first clutch CL1 and the second clutch CL2, respectively.

The rotational shaft of the motor 4 and a rotational shaft of the transmission 6 are coaxially coupled together by a shaft AX2. Typically, the transmission 6 is internally provided with one or more planetary gear set(s) each including a sun gear S1, a ring gear R1, a pinion gear P1 (planetary gear), and a carrier C1, and friction engagement elements (e.g., a clutch and a brake). The transmission 6 is an automatic transmission having a function of automatically switching a gear stage (gear ratio) according to vehicle speed and engine speed. The ring gear R1 is disposed to be concentric with the sun gear S1, and the pinion gear P1 is disposed between the sun gear S1 and the ring gear R1 to mesh with the sun gear S1 and the ring gear R1. The carrier C1 holds the pinion gear P1 to be rotatable as well as revolvable about the sun gear S1.

Further, the transmission 6 is internally provided with the second clutch CL2 which is disengageable (disconnectable). The second clutch CL2 can switch transmission and interruption of torque between the upstream side (the engine 2 and the motor 4) and the downstream side (the vehicle wheels 12, etc.) of the transmission 6. Also the second clutch CL2 is comprised of, for example, a dry multi-plate clutch or a wet multi-plate clutch which is changeable of a transmission torque capacity by a successive or phased control of a flow rate and/or a pressure of clutch hydraulic oil by the hydraulic control circuit 14. Note that, actually, the second clutch CL2 is comprised of a plurality of clutches used for switching various gear stages in the transmission 6. Further, although FIG. 1 illustrates a single planetary gear set for simplification, actually, the transmission 6 includes a plurality of planetary gear sets. By selectively engaging the friction engagement elements including the plurality of clutches (e.g., the second clutch CL2) and a plurality of brakes (not illustrated) to switch the power transmission path via each planetary gear set, for example, a plurality of forward gear stages and one reverse gear stage can be achieved.

The powertrain system 8 receives torque via an output shaft AX3 of the transmission 6. The powertrain system 8 is comprised of, for example, a differential gear which dividedly supplies the driving force to a pair of left and right vehicle wheels 12, and a final gear.

The hybrid vehicle 1 as described above can switch a traveling mode by switching the engagement and release of the first clutch CL1. That is, the hybrid vehicle 1 includes a first traveling mode in which the first clutch CL1 is set to the released state and the hybrid vehicle 1 travels using the torque of the motor 4 without using the torque of the engine 2, and a second traveling mode in which the first clutch CL1 is set to the engaged state and the hybrid vehicle 1 travels using at least the torque of the engine 2. The first traveling mode is a so-called EV traveling mode, and the second traveling mode includes an engine traveling mode in which the hybrid vehicle 1 travels using only the torque of the engine 2, and a hybrid traveling mode (HV traveling mode) in which the hybrid vehicle 1 travels using both of the torque of the engine 2 and the torque of the motor 4.

Figure 2:
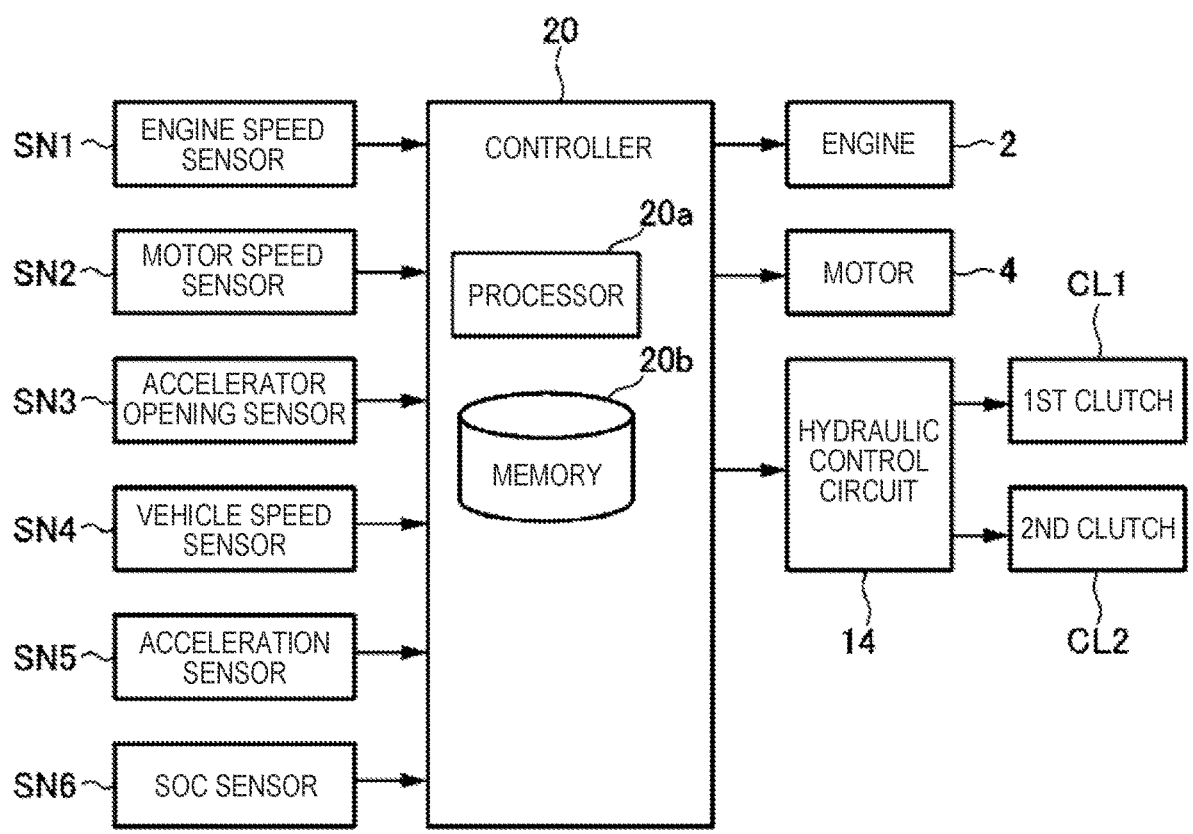
FIG. 2 is a block diagram illustrating an electric configuration of the hybrid vehicle according to this embodiment.

FIG. 2 is a block diagram illustrating an electric configuration of the hybrid vehicle according to this embodiment.

As illustrated in FIG. 2, a controller 20 receives an input of signals from an engine speed sensor SN1, a motor speed sensor SN2, an accelerator opening sensor SN3, a vehicle speed sensor SN4, an acceleration sensor SN5, and an SOC sensor SN6. The engine speed sensor SN1 detects the speed of the engine 2. The motor speed sensor SN2 detects the speed of the motor 4. The accelerator opening sensor SN3 detects an accelerator opening corresponding to a depressed amount of an accelerator pedal by a driver. The vehicle speed sensor SN4 detects a vehicle speed of the hybrid vehicle 1. The acceleration sensor SN5 detects an acceleration of the hybrid vehicle 1 in a front-and-rear direction. The SOC sensor SN6 detects a state of charge (SOC) of the battery 5.

The controller 20 is comprised of a computer including one or more processor(s) 20a (typically, a central processing unit (CPU)), and memory 20b (e.g., ROM and RAM) which stores various programs which are interpretively executed on the processor 20a (including a basic control program such as an operation system (OS) and an application program actuated on the OS to implement a specific function) and various data. The controller 20 is an example of a "control device" according to the present disclosure, and executes a "method of controlling the hybrid vehicle" according to the present disclosure.

In detail, the controller 20 mainly controls the engine 2, the motor 4, and the hydraulic control circuit 14 by outputting control signals thereto based on detection signals from the sensors SN1-SN6 described above. For example, the controller 20 controls the engine 2 to adjust an ignition timing, a fuel injection timing, and a fuel injection amount, controls the motor 4 to adjust the speed and the torque, and controls the hydraulic control circuit 14 to adjust the hydraulic pressure applied to the first and second clutches CL1 and CL2. Actually, the controller 20 controls a spark plug, a fuel injection valve, and a throttle valve of the engine 2, controls the motor 4 via the inverter, and controls the motor and the solenoid valves of the hydraulic control circuit 14.

Control of Hybrid Vehicle

Next, contents of control executed by the controller 20 according to this embodiment are described. In this embodiment, in response to a startup demand of the engine 2 in a stopped state during traveling, the controller 20 controls, by the hydraulic control circuit 14, the hydraulic pressure to be supplied to the first clutch CL1 so that the first clutch CL1 provided between the engine 2 and the motor 4 is shifted from the released state to a given slipping state or the engaged state. According to this, the torque of the motor 4 is transmitted to the engine 2 via the first clutch CL1 and the engine 2 is cranked by the motor 4, and thus the engine 2 being started-up. Further, during such a startup of the engine 2, the controller 20 shifts the second clutch CL2 provided between the motor 4 and the vehicle wheels 12 from the engaged state to a given slipping state. According to this, transmission of the torque between the driving source (particularly, the engine 2) and the vehicle wheels 12 via the second clutch CL2 is reduced as much as possible, and therefore, a shock caused to the hybrid vehicle 1 (vehicle shock) due to the torque transmission can be reduced. For example, the vehicle shock includes deceleration of the vehicle by a kinetic energy of the traveling hybrid vehicle 1 being transmitted to the engine 2 side and used for the startup of the engine.

Particularly, in this embodiment, when the first clutch CL1 is shifted from the released state to the slipping state or the engaged state, the controller 20 changes an instruction hydraulic pressure to the hydraulic control circuit 14 according to whether a target driving force of the hybrid vehicle 1 is below a given value. The target driving force is set based on an accelerator pedal operation by the driver, and a traveling situation of the hybrid vehicle 1 (including the vehicle speed, the acceleration, the gear stage, and the traveling mode). For example, when the target driving force is below the given value (hereinafter, referred to as a "normal mode"), suppression of the vehicle shock is prioritized over the startup response of the engine 2, and the controller 20 sets the instruction hydraulic pressure such that the first clutch CL1 is slowly shifted from the released state to the given slipping state. On the other hand, when the target driving force is above the given value (hereinafter, referred to as a "high response mode"), improvement in the startup response of the engine 2 is prioritized over the suppression of the vehicle shock, and the controller 20 sets the instruction hydraulic pressure such that the first clutch CL1 is shifted from the released state to the given slipping state more rapidly compared with in the normal mode. Therefore, both of the securing of the startup response of the engine and the suppression of the vehicle shock can be achieved as necessary.

Figure 3:
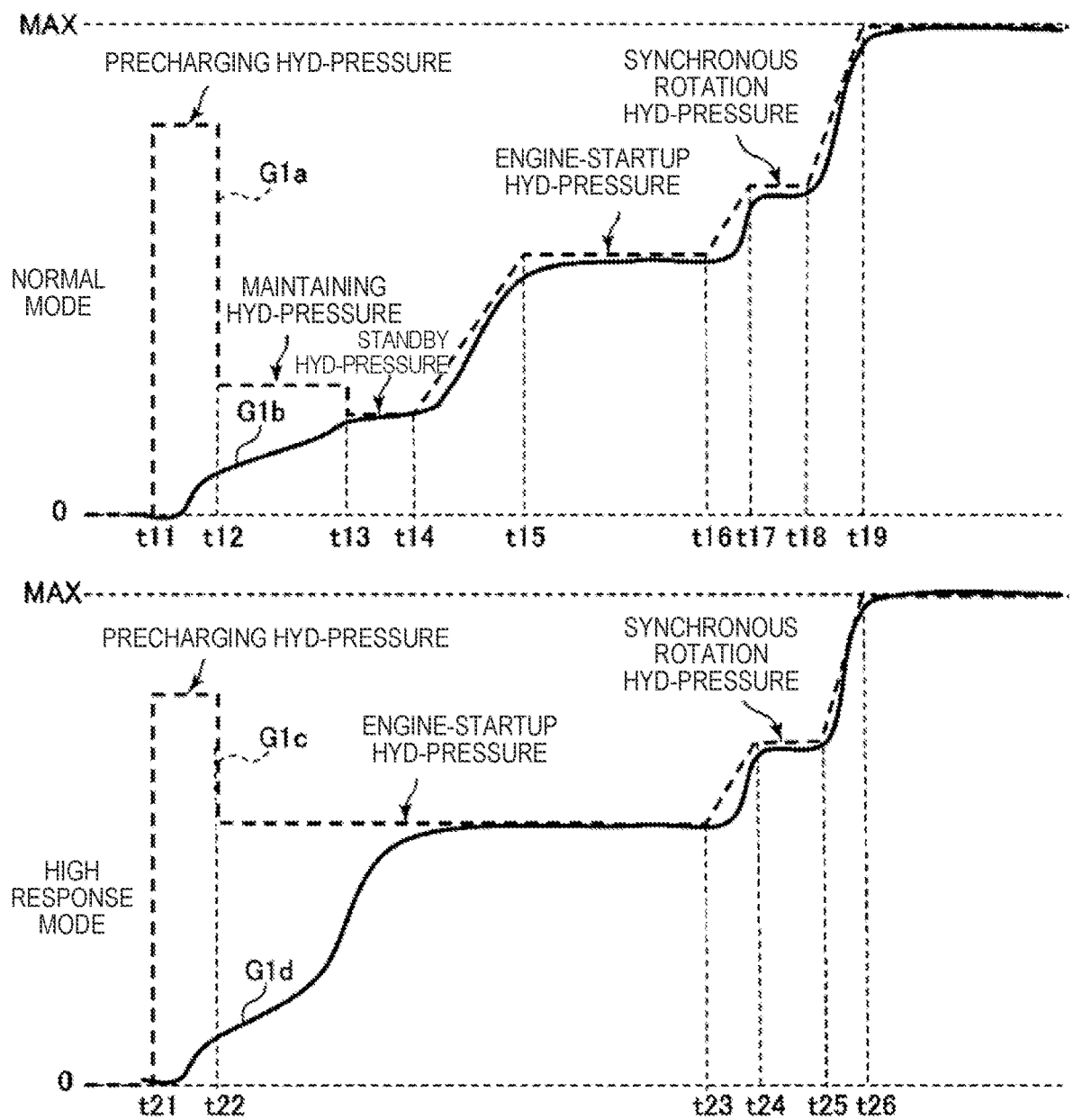
FIG. 3 is a time chart illustrating control of a first clutch according to this embodiment.
Figure 4:
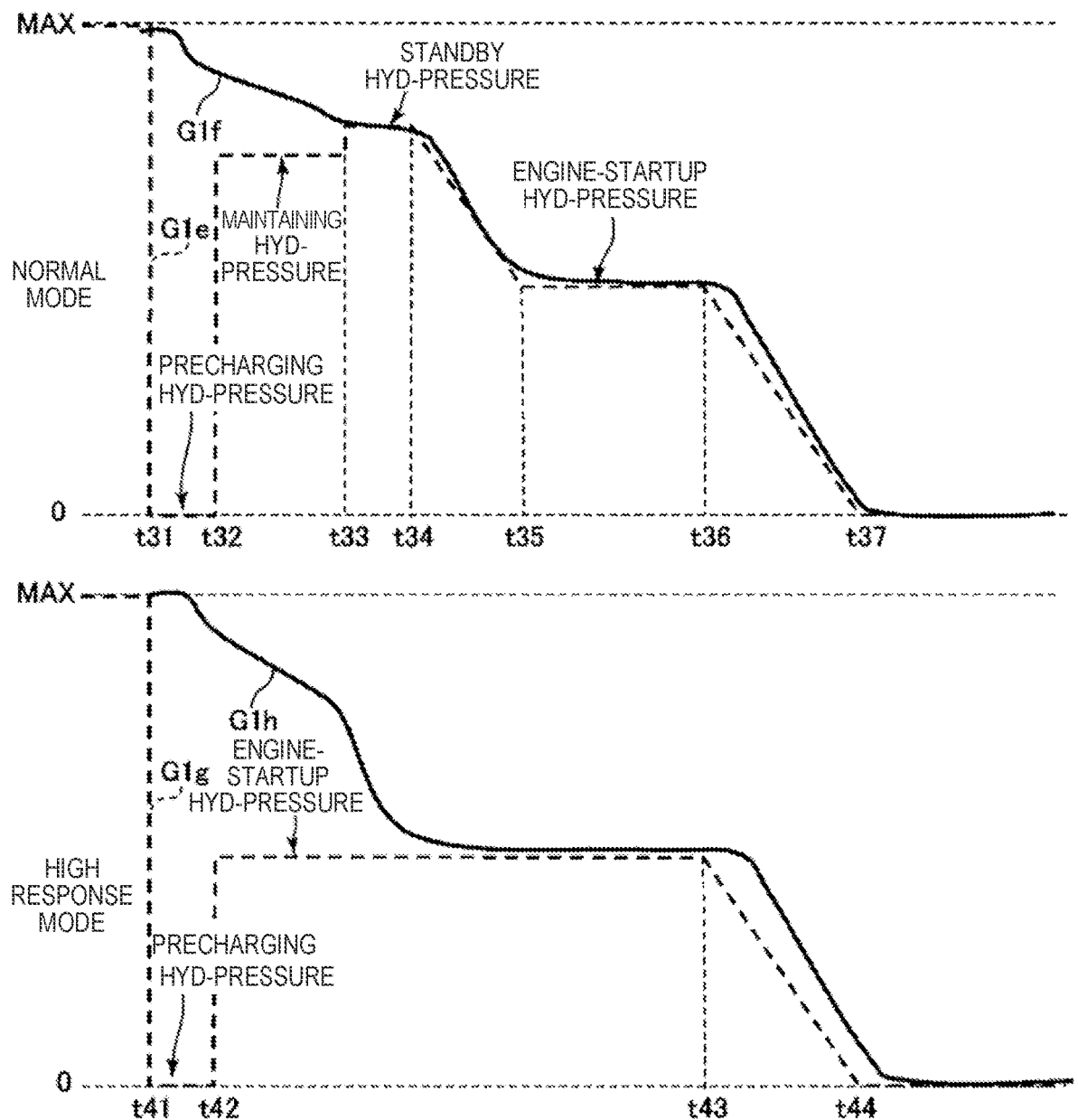
FIG. 4 is a time chart illustrating control of the first clutch according to this embodiment.

Next, with reference to FIGS. 3 and 4, control of the first clutch CL1 according to this embodiment is described in detail. FIG. 3 is a time chart illustrating the control of the normally open first clutch CL1.

In FIG. 3, graph G1$a$ indicates the instruction hydraulic pressure when the hydraulic pressure to be applied to the first clutch CL1 is instructed to the hydraulic control circuit 14 in the normal mode, and graph G1$b$ indicates an actual hydraulic pressure applied to the first clutch CL1 in the normal mode. Graph G1$c$ indicates the instruction hydraulic pressure when the hydraulic pressure to be applied to the first clutch CL1 is instructed to the hydraulic control circuit 14 in the high response mode, and graph G1$d$ indicates an actual hydraulic pressure applied to the first clutch CL1 in the high response mode.

In the normal mode, when the start of the engine 2 is demanded at a time t11, the controller 20 temporarily increases, between the time t11 and a time t12, the instruction hydraulic pressure to a hydraulic pressure for precharging (precharging hydraulic pressure) in a stepped shape. The precharging hydraulic pressure is an instruction hydraulic pressure (fourth hydraulic pressure) at which, when the actual hydraulic pressure of the first clutch CL1 reaches the precharging hydraulic pressure, an engagement pressure higher than an engagement pressure for transmitting torque required for the start of the engine 2 (engine-startup engagement pressure) can be generated and applied to the first clutch CL1. When the first clutch CL1 is the normally open clutch, the precharging hydraulic pressure is set according to a flow rate of the hydraulic oil required when filling to an oil chamber of the first clutch CL1. Further, the period of time during which the instruction hydraulic pressure is set to the precharging hydraulic pressure (from the time t11 to the time t12) is set based on a capacity of the oil chamber of the first clutch CL1. In this manner, by temporarily setting the relatively high instruction hydraulic pressure immediately after the issuance of the startup demand of the engine 2, the hydraulic oil can promptly be filled in the oil chamber of the first clutch CL1, and a response of the first clutch CL1 in the subsequent control can be improved.

Then, between the time t12 and a time t13, the controller 20 temporarily lowers the instruction hydraulic pressure to a maintaining hydraulic pressure in a stepped shape. The maintaining hydraulic pressure is an instruction hydraulic pressure (first hydraulic pressure) at which, when the first clutch CL1 starts engaging while the instruction hydraulic pressure is at the maintaining hydraulic pressure, an increase rate in the engagement pressure is below a given rate. By setting the instruction hydraulic pressure as described above, occurrence of the vehicle shock when the first clutch CL1 starts engaging can be reduced.

Then, between the time t13 and a time t14, the controller 20 temporarily lowers the instruction hydraulic pressure to a standby hydraulic pressure in a stepped shape. The standby hydraulic pressure is an instruction hydraulic pressure (fifth hydraulic pressure) at which the first clutch CL1 stands-by in a state immediately before engaging. By setting the instruction hydraulic pressure as described above, when the start of the cranking of the engine 2 is required to be waited until other devices become ready (e.g., until the second clutch CL2 is shifted from the engaged state to the given slipping state), the torque transmission between the motor 4 and the engine 2 is interrupted, and once the other devices become ready, the first clutch CL1 can be promptly connected so that the cranking of the engine 2 is started.

Then, when the other devices become ready at the time t14, the controller 20 increases the instruction hydraulic pressure to an engine-startup hydraulic pressure, and maintains the engine-startup hydraulic pressure between a time t15 and a time t16 until the engine start is completed. The engine-startup hydraulic pressure is an instruction hydraulic pressure (second hydraulic pressure) at which the engine-startup engagement pressure for transmitting torque required for the engine start is generated and applied to the first clutch CL1. By setting the instruction hydraulic pressure as described above, the torque required for the startup of the engine 2 is transmitted from the motor 4 to the engine 2 via the first clutch CL1, and the engine 2 can be cranked to start.

Then, when the engine start is completed at the time t16, the controller 20 increases the instruction hydraulic pressure to a hydraulic pressure for synchronizing rotation (synchronous rotation hydraulic pressure), and maintains the synchronous rotation hydraulic pressure between a time t17 and a time t18 until the speed of the engine 2 increases and a differential rotation between the motor 4 and the engine 2 becomes sufficiently small. The synchronous rotation hydraulic pressure is an instruction hydraulic pressure at which the first clutch CL1 is applied with a hydraulic pressure higher than the engine-startup hydraulic pressure and lower than the maximum hydraulic pressure applicable to the first clutch CL1. By setting the instruction hydraulic pressure as described above, even after the completion of the engine start, the slipping state of the first clutch CL1 is maintained until the differential rotation between the engine 2 and the motor 4 becomes sufficiently small, and thus, the occurrence of the vehicle shock can be avoided even when the speed of the engine 2 is increased excessively.

Then, when the speed of the engine 2 increases and the differential rotation between the motor 4 and the engine 2 becomes sufficiently small at the time t18, the controller 20 increases the instruction hydraulic pressure to be the maximum hydraulic pressure at a time t19. The maximum hydraulic pressure is an instruction hydraulic pressure (third hydraulic pressure) for setting the first clutch CL1 to the engaged state. By setting the instruction hydraulic pressure as described above, the output torque of the engine 2 can be transmitted to the motor 4 side via the first clutch CL1.

On the other hand, in the case of the high response mode, when the startup of the engine 2 is demanded at a time t21, similarly to the case of the normal mode, the controller 20 temporarily increases, between the time t21 and a time t22, the instruction hydraulic pressure to the precharging hydraulic pressure in a stepped shape. Note that, although in FIG. 3 the period of time during which the instruction hydraulic pressure is maintained at the precharging hydraulic pressure is substantially the same between in the normal mode and in the high response mode, it may be set longer in the high response mode than in the normal mode. Accordingly, the response of the first clutch CL1 can further be improved.

Then, the controller 20 lowers the instruction hydraulic pressure to the engine-startup hydraulic pressure in a stepped shape without setting to the maintaining hydraulic pressure and the standby hydraulic pressure, and maintains the engine-startup hydraulic pressure between the time t22 and a time t23 until the engine start is completed. By setting the instruction hydraulic pressure as described above, the improvement in the startup response of the engine 2 is prioritized over the suppression of the vehicle shock, and the engine 2 can promptly be cranked to start when the startup of the engine 2 is demanded.

Then, when the engine start is completed at the time t23, similarly to the case of the normal mode, the controller 20 increases the instruction hydraulic pressure to the synchronous rotation hydraulic pressure, and maintains the synchronous rotation hydraulic pressure between a time t24 and a time t25 until the speed of the engine 2 increases and the differential rotation between the motor 4 and the engine 2 becomes sufficiently small. Then, when the speed of the engine 2 increases and the differential rotation between the motor 4 and the engine 2 becomes sufficiently small at the time t25, the controller 20 increases the instruction hydraulic pressure to be the maximum hydraulic pressure at a time t26.

FIG. 4 is a time chart illustrating the control of the normally close first clutch CL1. In FIG. 4, graph G1e indicates the instruction hydraulic pressure when the hydraulic pressure to be applied to the first clutch CL1 is instructed to the hydraulic control circuit 14 in the normal mode, and graph G1f indicates an actual hydraulic pressure applied to the first clutch CL1 in the normal mode. Graph G1g indicates the instruction hydraulic pressure when the hydraulic pressure to be applied to the first clutch CL1 is instructed to the hydraulic control circuit 14 in the high response mode, and graph G1h indicates an actual hydraulic pressure applied to the first clutch CL1 in the high response mode.

In the normal mode, when the start of the engine 2 is demanded at a time t31, the controller 20 temporarily lowers, between the time t31 and a time t32, the instruction hydraulic pressure to the precharging hydraulic pressure in a stepped shape. When the first clutch CL1 is the normally-closed clutch, the precharging hydraulic pressure is set according to a flow rate of the hydraulic oil required when discharging from the oil chamber of the first clutch CL1. Further, the period of time during which the instruction hydraulic pressure is set to the precharging hydraulic pressure (from the time t31 to the time t32) is set based on the capacity of the oil chamber of the first clutch CL1. In this manner, by temporarily setting the relatively low instruction hydraulic pressure immediately after the issuance of the startup demand of the engine 2, the hydraulic oil can promptly be discharged from the oil chamber of the first clutch CL1, and the response of the first clutch CL1 can be improved.

Then, between the time t32 and a time t33, the controller 20 temporarily increases the instruction hydraulic pressure to the maintaining hydraulic pressure in a stepped shape. By setting the instruction hydraulic pressure as described above, similarly to the case where the first clutch CL1 is the normally-open clutch, the occurrence of the vehicle shock at the start of engaging of the first clutch CL1 can be avoided.

Then, between the time t33 and a time t34, the controller 20 temporarily increases the instruction hydraulic pressure to the standby hydraulic pressure in a stepped shape. By setting the instruction hydraulic pressure as described above, similarly to the case where the first clutch CL1 is the normally-open clutch, when the start of the cranking of the engine 2 is required to be waited until the other devices become ready (e.g., until the second clutch CL2 is shifted from the engaged state to the given slipping state), the torque transmission between the motor 4 and the engine 2 is interrupted, and once the other devices become ready, the first clutch CL1 can promptly engage so that the cranking of the engine 2 is started.

Then, when the other devices become ready at the time t34, the controller 20 lowers the instruction hydraulic pressure to the engine-startup hydraulic pressure, and maintains the engine-startup hydraulic pressure between a time t35 and a time t36 until the startup of the engine 2 is completed. By setting the instruction hydraulic pressure as described above, similarly to the case where the first clutch CL1 is the normally-open clutch, the torque required for the startup of the engine 2 is transmitted from the motor 4 to the engine 2 via the first clutch CL1, and the engine 2 can be cranked to start.

Then, when the engine start is completed at the time t36, the controller 20 lowers the instruction hydraulic pressure to be the minimum hydraulic pressure ("0" in FIG. 4) at a time t37. The minimum hydraulic pressure is an instruction hydraulic pressure (third hydraulic pressure) for setting the first clutch CL1 to the engaged state. By setting the instruction hydraulic pressure as described above, the output torque of the engine 2 can be transmitted to the motor 4 side via the first clutch CL1.

On the other hand, in the case of the high response mode, when the startup of the engine 2 is demanded at a time t41, similarly to the case of the normal mode, the controller 20 temporarily lowers, between the time t41 and a time t42, the instruction hydraulic pressure to the precharging hydraulic pressure in a stepped shape.

Then, the controller 20 increases the instruction hydraulic pressure to the engine-startup hydraulic pressure in a stepped shape without setting to the maintaining hydraulic pressure and the standby hydraulic pressure, and maintains the engine-startup hydraulic pressure between the time t42 and a time t43 until the engine start is completed. By setting the instruction hydraulic pressure as described above, similarly to the case where the first clutch CL1 is the normally-open clutch, the improvement in the startup response of the engine 2 is prioritized over the suppression of the vehicle shock, and the engine 2 can promptly be cranked to start when the startup of the engine 2 is demanded.

Then, when the engine start is completed at the time t43, similarly to the case of the normal mode, the controller 20 lowers the instruction hydraulic pressure to be the minimum hydraulic pressure at a time t44.

Figure 5:
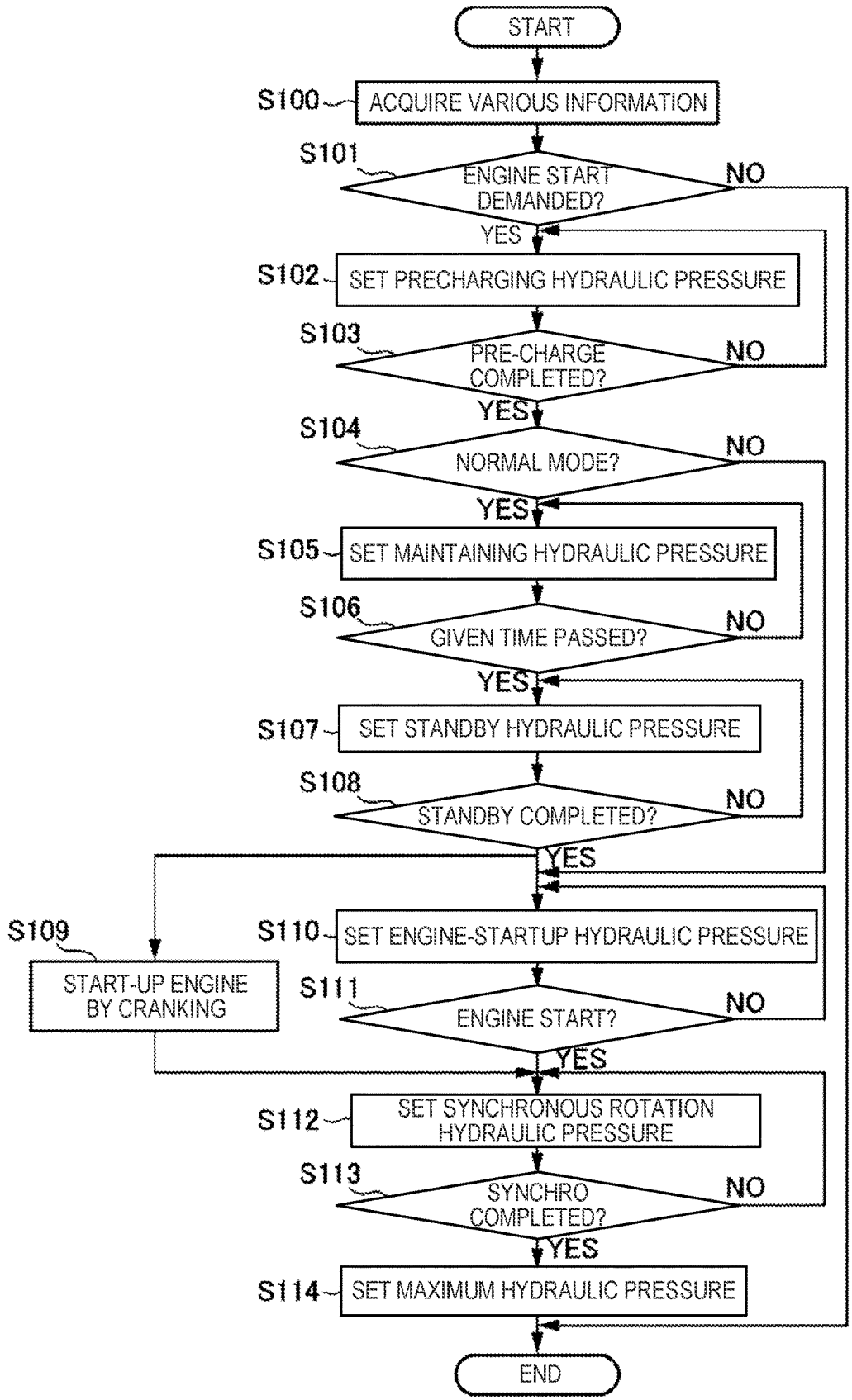
FIG. 5 is a flowchart illustrating startup control according to this embodiment.

Next, the overall flow of the startup control of the engine 2 according to this embodiment is described with reference to FIG. 5. FIG. 5 is a flowchart illustrating the startup control according to this embodiment. This flow is repeatedly executed by the controller 20 at a given cycle.

First, at Step S100, the controller 20 acquires various information. For example, the controller 20 acquires the detection signals at least from the sensors SN1-SN6 described above.

Next, at Step S101, the controller 20 determines whether the startup of the currently stopped engine 2 is demanded. For example, this startup demand is issued when the driver demands a comparatively large acceleration in the EV traveling mode (i.e., the driver demands acceleration which requires the switching of the traveling mode from the EV traveling mode to the HV traveling mode). Further, other than the demand from the driver, the startup demand is issued from a control system including the powertrain (hereinafter, this startup demand may suitably be referred to as a "system demand"). This system demand is issued when the switching of the traveling mode from the EV traveling mode to the HV traveling mode is required according to the vehicle speed, the vehicle load, the battery state, and the engine temperature. For example, the system demand may be issued when the driving force of only the motor 4 is insufficient to achieve the target driving force, when the battery 5 requires charging (when the SOC of the battery 5 is below a given value), and when engine braking by the engine 2 is required during deceleration.

At Step S101, if the controller 20 determines that the startup demand is not issued (Step S101: NO), the controller 20 ends the processing related to the startup control. On the other hand, if the controller 20 determines that the startup demand is issued (Step S101: YES), the controller 20 starts shifting of the second clutch CL2 from the engaged state to the given slipping state, and proceeds to Step S102. At Step S102, the controller 20 sets the instruction hydraulic pressure to the hydraulic control circuit 14 to the precharging hydraulic pressure, and maintains the precharging hydraulic pressure for a given period of time set in advance.

Next, at Step S103, the controller 20 determines whether the given period of time has elapsed after the setting of the instruction hydraulic pressure to the precharging hydraulic pressure, and the precharging is completed. As a result, if the controller 20 determines that the given time period has elapsed and the precharging is completed (Step S103: YES), the controller 20 proceeds to Step S104. On the other hand, if the controller 20 determines that the given time period has not elapsed and the precharging is not completed (Step S103: NO), the controller 20 returns to Step S102, and repeats the processing at Steps S102 and S103 until the precharging is completed.

Next, at Step S104, the controller 20 determines whether the target driving force of the hybrid vehicle 1 is below the given value (i.e., in the normal mode). As a result, if the controller 20 determines as the normal mode (Step S104: YES), the controller 20 proceeds to Step S105.

At Step S105, the controller 20 sets the instruction hydraulic pressure to the maintaining hydraulic pressure, and maintains the maintaining hydraulic pressure for a given period of time. Next, at Step S106, the controller 20 determines whether the given period of time has elapsed after the setting of the instruction hydraulic pressure to the maintaining hydraulic pressure. As a result, if the controller 20 determines that the given time period has elapsed (Step S106: YES), the controller 20 proceeds to Step S107. On the other hand, if the controller 20 determines that the given time period has not elapsed (Step S106: NO), the controller 20 returns to Step S105, and repeats the processing at Steps S105 and S106 until the given time period elapses.

Next, at Step S107, the controller 20 sets the instruction hydraulic pressure to the standby hydraulic pressure, and maintains the standby hydraulic pressure until a condition for completion of the standby is satisfied (e.g., until the second clutch CL2 is shifted from the engaged state to the given slipping state). Then, at Step S108, the controller 20 determines whether the condition for the standby completion is satisfied. As a result, if the controller 20 determines that the condition is satisfied (e.g., the second clutch CL2 is shifted from the engaged state to the given slipping state) (Step S108: YES), the controller 20 proceeds to Steps S109 and S110. On the other hand, if the controller 20 determines that the condition for the standby completion is not satisfied (Step S108: NO), the controller 20 returns to Step S107, and repeats the processing at Steps S107 and S108 until the condition is satisfied.

Further, at Step S104, if the controller 20 does not determine as the normal mode where the target driving force of the hybrid vehicle 1 is below the given value (i.e., in the high response mode where the target driving force is above the given value) (Step S104: NO), the controller 20 omits the processing at Steps S105 to S108, and proceeds to Steps S109 and S110.

At Step S109, the controller 20 controls the motor 4 to start the engine 2 by cranking. Then, when the engine 2 starts-up, the controller 20 proceeds to Step S112.

Further, in parallel with the processing at Step S109, the controller 20 sets, at Step S110, the instruction hydraulic pressure to the engine-startup hydraulic pressure, and maintains the engine-startup hydraulic pressure until the engine start is completed. Then, at Step S111, the controller 20 determines whether the engine start is completed. As a result, if the controller 20 determines that the engine start is completed (Step S111: YES), the controller 20 proceeds to Step S112. On the other hand, if the controller 20 determines that the engine start is not completed (Step S111: NO), the controller 20 returns to Step S110, and repeats the processing at Steps S110 and S111 until the engine start is completed.

Next, at Step S112, the controller 20 sets the instruction hydraulic pressure to the synchronous rotation hydraulic pressure, and maintains the synchronous rotation hydraulic pressure until the synchronization of the rotation is completed (i.e., the speed of the engine 2 is increased and the differential rotation between the motor 4 and the engine 2 becomes sufficiently small). Next, at Step S113, the controller 20 determines whether the synchronous rotation is completed. As a result, if the controller 20 determines that the synchronous rotation is completed (Step S113: YES), the controller 20 proceeds to Step S114. On the other hand, if the controller 20 determines that the synchronous rotation is not completed (Step S113: NO), the controller 20 returns to Step S112, and repeats the processing at Steps S112 and S113 until the synchronous rotation is completed.

Next, at Step S114, the controller 20 sets the instruction hydraulic pressure to the maximum hydraulic pressure, and sets the first clutch CL1 to the engaged state. Further, the controller 20 also sets the second clutch CL2 to the engaged state. Then, the controller 20 ends the processing related to the startup control.

Operation and Effects

Next, operation and effects of the control method and the control system of the hybrid vehicle according to this embodiment are described.

According to this configuration, when the startup demand of the engine 2 is issued and the hydraulic pressure to be applied to the first clutch CL1 is controlled, in the normal mode where the target driving force of the hybrid vehicle 1 is below the given value, the controller 20 sets the instruction hydraulic pressure to the hydraulic control circuit 14, to the maintaining hydraulic pressure at which the increase rate in the engagement pressure when the first clutch CL1 starts engaging becomes below the given rate, and maintains the maintaining hydraulic pressure for the given period of time. Then, the controller 20 sets the instruction hydraulic pressure to the engine-startup hydraulic pressure at which the engine-startup engagement pressure for transmitting the torque required for the engine start is generated and applied to the first clutch CL1, and maintains the engine-startup hydraulic pressure until the engine start is completed. Then, the controller 20 sets the instruction hydraulic pressure to the maximum hydraulic pressure for setting the first clutch CL1 to the engaged state. Therefore, when the target driving force is below the given value, and the suppression of the vehicle shock is to be prioritized over the startup response of the engine 2, the occurrence of the vehicle shock at the start of engaging of the first clutch CL1 to start the engine 2, can be avoided. On the other hand, in the high response mode where the target driving force is above the given value, the controller 20 sets the instruction hydraulic pressure to the engine-startup hydraulic pressure without setting to the maintaining hydraulic pressure, and maintains the engine-startup hydraulic pressure until the engine start is completed. Then, the controller 20 sets the instruction hydraulic pressure to the maximum hydraulic pressure. Therefore, when the target driving force is above the given value, and the improvement in the startup response of the engine 2 is to be prioritized over the suppression of the vehicle shock, the engine 2 can promptly be cranked to start-up in response to the issuance of the startup demand of the engine 2, and thus, the startup response of the engine can be secured. As described above, according to this embodiment, the vehicle shock can be suppressed while securing the startup response of the engine.

Further, according to this embodiment, when the startup of the engine 2 is demanded, first, the controller 20 sets the instruction hydraulic pressure to the precharging hydraulic pressure at which the engagement pressure higher than the engine-startup engagement pressure can be generated and applied to the first clutch CL1, and maintains the precharging hydraulic pressure for the given period of time. Therefore, the hydraulic oil can promptly be filled in the oil chamber of the first clutch CL1 immediately after the issuance of the startup demand of the engine 2, which improves the response of the first clutch CL1 in the subsequent control.

Further, by setting the period of time during which the instruction hydraulic pressure is set to the precharging hydraulic pressure to be longer in the high response mode than in the normal mode, the response of the first clutch CL1 can be further improved.

Further, in the normal mode, after the controller 20 sets the instruction hydraulic pressure to the maintaining hydraulic pressure and maintains the maintaining hydraulic pressure for the given period of time, and before setting to the engine-startup hydraulic pressure, the controller 20 sets the instruction hydraulic pressure to the standby hydraulic pressure at which the first clutch CL1 stands-by in the state immediately before engaging, and maintains the standby hydraulic pressure until the given condition is satisfied. Therefore, when the startup of the engine 2 is required to be waited until other devices become ready, the torque transmission between the motor 4 and the engine 2 is interrupted, and once the other devices become ready, the first clutch CL1 can promptly engage so that the engine 2 starts-up.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Hybrid Vehicle
2 Engine
4 Motor
5 Battery
6 Transmission
8 Powertrain System
12 Vehicle Wheels
14 Hydraulic Control Circuit
20 Controller (Control Device)
CL1 First Clutch (Friction Engagement Element)
CL2 Second Clutch

What is claimed is:

1. A method of controlling a hybrid vehicle including an engine, a motor, a friction engagement element provided between the engine and the motor to be disengageable by hydraulic pressure, and a hydraulic control circuit configured to control the hydraulic pressure to be applied to the friction engagement element, the method comprising the steps of:
   controlling the hydraulic pressure to be applied to the friction engagement element in response to a startup demand of the engine in a stopped state during traveling of the hybrid vehicle so that the friction engagement element is shifted from a released state to one of a given slipping state and an engaged state; and
   controlling the motor and the engine so that the motor cranks the engine to start, one or both of during and after the controlling the hydraulic pressure,
   wherein the controlling the hydraulic pressure includes:
      when a target driving force of the hybrid vehicle is below a given value, setting an instruction hydraulic pressure for the hydraulic control circuit to a first hydraulic pressure and maintaining the first hydraulic pressure for a given period of time, then setting the instruction hydraulic pressure to a second hydraulic pressure and maintaining the second hydraulic pressure until the engine start is completed, and then setting the instruction hydraulic pressure to a third hydraulic pressure, the first hydraulic pressure being a pressure at which an increase rate in an engagement pressure at a start of engaging of the friction engagement element becomes below a given rate, the second hydraulic pressure being a pressure at which an engine-startup engagement pressure for transmitting torque required for the engine start is applied to the friction engagement element, and the third hydraulic pressure being a pressure for setting the friction engagement element to the engaged state; and
      when the target driving force of the hybrid vehicle is above the given value, setting the instruction hydraulic pressure to the second hydraulic pressure without setting to the first hydraulic pressure, and maintaining the second hydraulic pressure until the engine start is completed, and then setting the instruction hydraulic pressure to the third hydraulic pressure.

2. The method of claim 1, wherein the controlling the hydraulic pressure includes, in response to the startup demand of the engine, first setting the instruction hydraulic pressure to a fourth hydraulic pressure at which an engagement pressure higher than the engine-startup engagement pressure is applied to the friction engagement element, and maintaining the fourth hydraulic pressure for a given period of time.

3. The method of claim 2, wherein when the target driving force is above the given value, the period of time during which the instruction hydraulic pressure is maintained at the fourth hydraulic pressure is longer compared with when the target driving force is below the given value.

4. The method of claim 3, wherein the controlling the hydraulic pressure includes, when the target driving force is below the given value, after the setting the instruction hydraulic pressure to the first hydraulic pressure and maintaining for the given period of time, and before the setting the instruction hydraulic pressure to the second hydraulic pressure, setting the instruction hydraulic pressure to a fifth hydraulic pressure for making the friction engagement element stand by in a state immediately before engaging, and maintaining the fifth hydraulic pressure until a given condition is satisfied.

5. The method of claim 4, wherein the friction engagement element is a normally-open clutch, the third hydraulic pressure is higher than the second hydraulic pressure, and the second hydraulic pressure is higher than the first hydraulic pressure.

6. The method of claim 4, wherein the friction engagement element is a normally-closed clutch, the third hydraulic pressure is higher than the second hydraulic pressure, and the second hydraulic pressure is higher than the first hydraulic pressure.

7. A control system of a hybrid vehicle, comprising:
an engine and a motor:
a friction engagement element provided between the engine and the motor to be disengageable by hydraulic pressure;
a hydraulic control circuit configured to control the hydraulic pressure to be applied to the friction engagement element; and
a control device configured to control the engine, the motor, the friction engagement element, and the hydraulic control circuit,
wherein the control device is configured to:
control the hydraulic pressure to be applied to the friction engagement element in response to a startup demand of the engine in a stopped state during traveling of the hybrid vehicle so that the friction engagement element is shifted from a released state to one of a given slipping state and an engaged state; and
control the motor and the engine so that the motor cranks the engine to start, one or both of during and after the control of the hydraulic pressure,
wherein when the control device controls the hydraulic pressure:
when a target driving force of the hybrid vehicle is below a given value, the control device sets an instruction hydraulic pressure for the hydraulic control circuit to a first hydraulic pressure and maintains the first hydraulic pressure for a given period of time, then sets the instruction hydraulic pressure to a second hydraulic pressure and maintains the second hydraulic pressure until the engine start is completed, and then sets the instruction hydraulic pressure to a third hydraulic pressure, the first hydraulic pressure being a pressure at which an increase rate in an engagement pressure at a start of engaging of the friction engagement element becomes below a given rate, the second hydraulic pressure being a pressure at which an engine-startup engagement pressure for transmitting torque required for the engine start is applied to the friction engagement element, and the third hydraulic pressure being a pressure for setting the friction engagement element to the engaged state, and when the target driving force of the hybrid vehicle is above the given value, the control device sets the instruction hydraulic pressure to the second hydraulic pressure without setting to the first hydraulic pressure, and maintains the second hydraulic pressure until the engine start is completed, and then sets the instruction hydraulic pressure to the third hydraulic pressure.

8. The method of claim 1, wherein the controlling the hydraulic pressure includes, when the target driving force is below the given value, after the setting the instruction hydraulic pressure to the first hydraulic pressure and maintaining for the given period of time, and before the setting the instruction hydraulic pressure to the second hydraulic pressure, setting the instruction hydraulic pressure to a fifth hydraulic pressure for making the friction engagement element stand by in a state immediately before engaging, and maintaining the fifth hydraulic pressure until a given condition is satisfied.

9. The method of claim 1, wherein the friction engagement element is a normally-open clutch, the third hydraulic pressure is higher than the second hydraulic pressure, and the second hydraulic pressure is higher than the first hydraulic pressure.

10. The method of claim 1, wherein the friction engagement element is a normally-closed clutch, the third hydraulic pressure is higher than the second hydraulic pressure, and the second hydraulic pressure is higher than the first hydraulic pressure.

11. The method of claim 2, wherein the controlling the hydraulic pressure includes, when the target driving force is below the given value, after the setting the instruction hydraulic pressure to the first hydraulic pressure and maintaining for the given period of time, and before the setting the instruction hydraulic pressure to the second hydraulic pressure, setting the instruction hydraulic pressure to a fifth hydraulic pressure for making the friction engagement element stand by in a state immediately before engaging, and maintaining the fifth hydraulic pressure until a given condition is satisfied.

12. The method of claim 2, wherein the friction engagement element is a normally-open clutch, the third hydraulic pressure is higher than the second hydraulic pressure, and the second hydraulic pressure is higher than the first hydraulic pressure.

13. The method of claim 2, wherein the friction engagement element is a normally-closed clutch, the third hydraulic pressure is higher than the second hydraulic pressure, and the second hydraulic pressure is higher than the first hydraulic pressure.

14. The method of claim 3, wherein the friction engagement element is a normally-open clutch, the third hydraulic pressure is higher than the second hydraulic pressure, and the second hydraulic pressure is higher than the first hydraulic pressure.

15. The method of claim 3, wherein the friction engagement element is a normally-closed clutch, the third hydraulic pressure is higher than the second hydraulic pressure, and the second hydraulic pressure is higher than the first hydraulic pressure.

16. The method of claim 8, wherein the friction engagement element is a normally-open clutch, the third hydraulic pressure is higher than the second hydraulic pressure, and the second hydraulic pressure is higher than the first hydraulic pressure.

17. The method of claim 8, wherein the friction engagement element is a normally-closed clutch, the third hydraulic pressure is higher than the second hydraulic pressure, and the second hydraulic pressure is higher than the first hydraulic pressure.

18. The method of claim 11, wherein the friction engagement element is a normally-open clutch, the third hydraulic pressure is higher than the second hydraulic pressure, and the second hydraulic pressure is higher than the first hydraulic pressure.

19. The method of claim 11, wherein the friction engagement element is a normally-closed clutch, the third hydraulic pressure is higher than the second hydraulic pressure, and the second hydraulic pressure is higher than the first hydraulic pressure.

* * * * *